(12) United States Patent
Ueno

(10) Patent No.: US 11,319,013 B2
(45) Date of Patent: May 3, 2022

(54) STRADDLE VEHICLE

(71) Applicant: KAWASAKI JUKOGYO KABUSHIKI KAISHA, Kobe (JP)

(72) Inventor: Shusei Ueno, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 120 days.

(21) Appl. No.: 16/829,273

(22) Filed: Mar. 25, 2020

(65) Prior Publication Data

US 2020/0385079 A1 Dec. 10, 2020

(30) Foreign Application Priority Data

Jun. 5, 2019 (JP) .............................. JP2019-105265

(51) Int. Cl.
| | |
|---|---|
| *B62J 43/16* | (2020.01) |
| *B60K 1/04* | (2019.01) |
| *B62K 11/04* | (2006.01) |
| *B62M 7/02* | (2006.01) |
| *B60K 6/28* | (2007.10) |
| *B62J 15/00* | (2006.01) |
| *B60L 50/64* | (2019.01) |
| *B60L 50/60* | (2019.01) |
| *B62J 23/00* | (2006.01) |

(52) U.S. Cl.
CPC ................ *B62J 43/16* (2020.02); *B60K 1/04* (2013.01); *B60L 50/64* (2019.02); *B60L 50/66* (2019.02); *B62K 11/04* (2013.01); *B62M 7/02* (2013.01); *B60K 6/28* (2013.01); *B60K 2001/0405* (2013.01); *B60Y 2200/12* (2013.01); *B60Y 2200/91* (2013.01); *B60Y 2200/92* (2013.01); *B62J 15/00* (2013.01); *B62J 23/00* (2013.01); *B62K 2204/00* (2013.01)

(58) Field of Classification Search
CPC . B62J 43/16; B62J 43/20; B62J 43/28; B62K 11/04; B62K 7/05; B60K 6/28; B60K 1/04; B62M 7/02
See application file for complete search history.

(56) References Cited

U.S. PATENT DOCUMENTS

| | | | |
|---|---|---|---|
| 9,327,586 B2 * | 5/2016 | Miyashiro | .............. B62K 11/04 |
| 10,611,425 B2 * | 4/2020 | Miyashiro | ............. H01M 50/20 |
| 2008/0236924 A1 | 10/2008 | Horii et al. | |
| 2012/0097463 A1 | 4/2012 | Iwata et al. | |
| 2013/0122570 A1 * | 5/2013 | Svendsen | ............. C12N 9/2428 |
| | | | 435/205 |

(Continued)

FOREIGN PATENT DOCUMENTS

| | | |
|---|---|---|
| EP | 2921398 A1 | 9/2015 |
| EP | 30882852 A2 | 11/2016 |
| JP | 2015077887 A | 4/2015 |

*Primary Examiner* — Tony H Winner
(74) *Attorney, Agent, or Firm* — Alleman Hall Creasman & Tuttle LLP

(57) ABSTRACT

A straddle vehicle includes: a driving electric motor configured to generate drive power to be transmitted to a drive wheel; a seat on which a rider sits; a battery pack disposed under the seat and storing electric power to be supplied to the driving electric motor; and a vehicle body frame including a receiving base supporting the battery pack. The receiving base has five surfaces supporting front, rear, left, right, and bottom surfaces of the battery pack, respectively.

7 Claims, 9 Drawing Sheets

(56) References Cited

U.S. PATENT DOCUMENTS

| | | | | |
|---|---|---|---|---|
| 2013/0216885 A1* | 8/2013 | Kawatani | ............. | H01M 50/20 |
| | | | | 429/100 |
| 2016/0318580 A1* | 11/2016 | Miyashiro | ............. | B62K 11/00 |
| 2016/0347199 A1* | 12/2016 | Mochizuki | ............. | B60L 50/64 |
| 2019/0176924 A1* | 6/2019 | Iwata | ................ | B62K 11/04 |

* cited by examiner

STRADDLE VEHICLE

CROSS-REFERENCE TO RELATED APPLICATION

This application claims priority to and the benefit of Japanese Patent Application No. 2019-105265, filed on Jun. 5, 2019, the entire disclosure of which is incorporated herein by reference.

BACKGROUND OF THE INVENTION

Field of the Invention

The present disclosure relates to a straddle vehicle such as a motorcycle which includes a driving electric motor configured to generate drive power to be transmitted to the drive wheel.

Description of the Related Art

Japanese Laid-Open Patent Application Publication No. 2015-77887 discloses a motorcycle configured as a hybrid vehicle equipped with a battery. The battery stores electric power to be supplied to a motor for travel in the electric vehicle (EV) mode.

Straddle vehicles such as motorcycles are lighter than four-wheeled vehicles and turn a corner with their vehicle bodies inclined laterally (banked). Thus, the maneuverability of a straddle vehicle is affected by the weights and locations of components mounted on the vehicle. A straddle vehicle running on drive power generated by a driving electric motor is equipped with a battery pack storing electric power to be supplied to the driving electric motor, and this battery pack is heavier than a battery mounted on a straddle vehicle running solely on engine power to store electric power to be supplied to electronic components (such as an ECU, a fuel pump, sensors, and lighting devices). A good maneuverability of a straddle vehicle equipped with such a heavy battery pack is difficult to ensure.

SUMMARY OF THE INVENTION

A straddle vehicle according to one aspect of the present disclosure includes: a driving electric motor configured to generate drive power to be transmitted to a drive wheel; a seat on which a rider sits; a battery pack disposed under the seat and storing electric power to be supplied to the driving electric motor; and a vehicle body frame including a receiving base supporting the battery pack, the receiving base having five surfaces supporting front, rear, left, right, and bottom surfaces of the battery pack, respectively.

In the above configuration, the battery pack provided for the drive system and storing electric power to be supplied to the driving electric motor is disposed under the seat, which means that the battery pack which is a heavy component is located in the vicinity of the center of gravity of the straddle vehicle. Additionally, the front, rear, left, right, and bottom surfaces of the battery pack are respectively supported by the five surfaces of the receiving base. Thus, the battery pack is held stably and integrally with the vehicle body frame even during acceleration/deceleration and roll motion of the straddle vehicle. As such, the straddle vehicle exhibits improved maneuverability despite the mounting of the relatively large battery pack for the drive system.

In an exemplary configuration, the vehicle body frame may include a presser member pressing a top surface of the battery pack.

In this configuration, the battery pack is held stably and integrally with the vehicle body frame even during vertical vibration of the straddle vehicle. As such, the straddle vehicle exhibits improved maneuverability despite the mounting of the relatively large battery pack which stores electric power to be supplied to the driving electric motor.

In an exemplary configuration, the straddle vehicle may further include: an auxiliary battery having a lower voltage than the battery pack; and a DC-DC converter configured to reduce the voltage of electric power output from the battery pack and supply the resulting electric power to the auxiliary battery. The vehicle body frame may include a main frame supporting the driving electric motor and a seat support frame extending obliquely upward and rearward from the main frame and supporting the seat, and in side view, the driving electric motor, the battery pack, the DC-DC converter, and the auxiliary battery may be arranged in a direction in which the seat support frame extends.

In this configuration, a wire harness connecting the driving electric motor, battery pack, DC-DC converter, and auxiliary battery together can be laid approximately along a straight line in side view. This allows for increased efficiency in laying the wire harness.

In an exemplary configuration, a lower end of the battery pack may be located below and forward of an upper end of a rear wheel serving as the drive wheel.

In this configuration, the battery pack is held by the receiving base stably and integrally with the vehicle body frame. As such, the battery pack can be located as close to the rear wheel as possible, and this allows for increased flexibility in mounting the relatively large battery pack.

In an exemplary configuration, the battery pack may include a battery cell, an electronic component electrically connected to the battery cell, a casing accommodating the battery cell and the electronic component, and a connector electrically connected to the battery cell and the electronic component. The electronic component may be disposed adjacent to the battery cell in a forward/rearward direction, and the connector may be mounted on an end portion of the casing in the forward/rearward direction.

In this configuration, the height dimension of the battery pack is smaller than in a configuration where the electronic component is disposed adjacent to the battery cell in an upward/downward direction. As such, while the battery pack is disposed under the seat, a high capacity of the battery pack can be achieved. Additionally, the width dimension of the battery pack is smaller than in a configuration where the electronic component is disposed adjacent to the battery cell in a leftward/rightward direction. As such, an increase in the vehicle width can be avoided to prevent a decrease in the ease with which the rider places the feet on the ground. Further, since the connector is mounted on an end portion of the casing in the forward/rearward direction, an electric wire can easily be laid to connect the battery pack to the electronic component mounted on the vehicle.

In an exemplary configuration, a side surface of the battery pack in a leftward/rightward direction may be exposed outside the straddle vehicle, and the battery pack may include a radiating fin member on the side surface.

In this configuration, the radiating fin member is disposed on the side surface of the casing. As such, the radiating fin member can successfully exchange heat with rearward stream of air passing through the legs of the rider sitting on the seat during travel, and thus the battery pack can be suitably cooled.

In an exemplary configuration, a rear lower edge of the battery pack may be chamfered.

In this configuration, the battery pack can be located as close to the rear wheel disposed rearward of and below the battery pack as possible, and this allows for increased flexibility in mounting the relatively large battery pack.

In an exemplary configuration, the straddle vehicle may further include a rear fender facing the drive wheel, and a front portion of the rear fender may cover the rear and bottom surfaces of the battery pack.

In this configuration, the battery pack, despite being disposed forward of and above the rear wheel, can be prevented from being splashed with mud water coming from the rear wheel.

DETAILED DESCRIPTION OF THE EMBODIMENTS

Hereinafter, an embodiment will be described with reference to the drawings.

Figure 1:
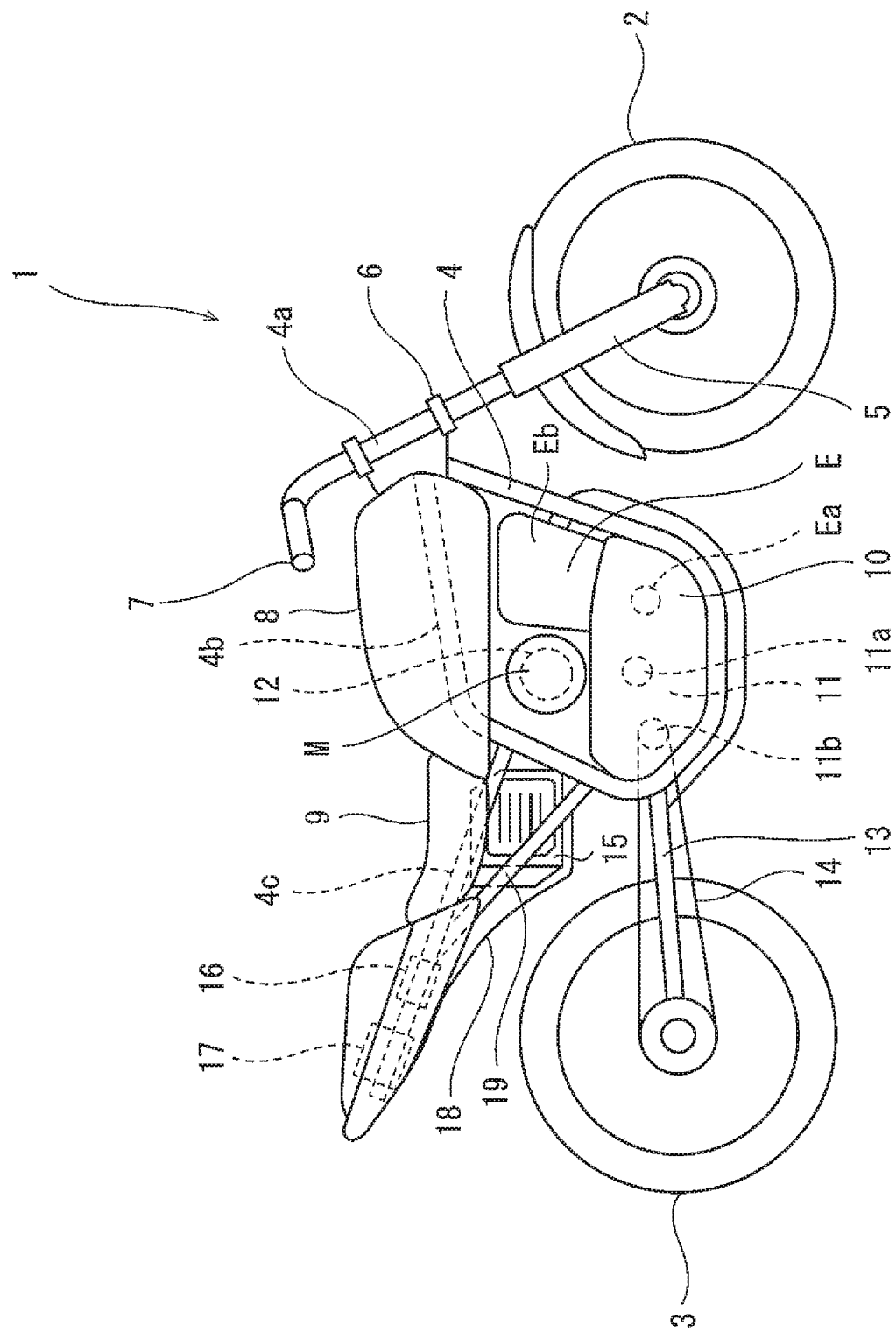
FIG. 1 is a side view of a motorcycle according to an embodiment.

FIG. 1 is a side view of a motorcycle 1 according to the embodiment. As shown in FIG. 1, the motorcycle 1 is an exemplary straddle vehicle on which the rider is seated in a straddling position. The motorcycle 1 is configured as a hybrid vehicle. The motorcycle 1 includes a front wheel 2, a rear wheel 3 (drive wheel), a vehicle body frame 4, a front suspension 5 connecting the front wheel 2 to a front portion of the vehicle body frame 4, and a rear suspension (not illustrated) connecting the rear wheel 3 to a rear portion of the vehicle body frame 4. The front suspension 5 is coupled to a bracket 6. A steering shaft connected to the bracket 6 is supported by a head pipe 4a constituting a part of the vehicle body frame 4, and the steering shaft is angularly movable.

The vehicle body frame 4 includes a main frame 4b extending rearward from the head pipe 4a, a seat support frame 4c extending obliquely upward and rearward from an upper portion of the main frame 4b, and an auxiliary frame 4d extending from a lower portion of the main frame 4b to a middle portion of the seat support frame 4c and supporting the seat support frame 4c from below. On the steering shaft is mounted a handle 7 to be grasped by hands of the rider. A fuel tank 8 is disposed rearward of the handle 7, and a seat 9 on which the rider sits is disposed rearward of the fuel tank 8. The seat 9 is supported by the seat support frame 4c. On the main frame 4b is mounted an engine E serving as a drive power source. The engine E is located between the front wheel 2 and the rear wheel 3. An electric motor M serving as a drive power source is disposed in the vicinity of the engine E.

The engine E includes a cylinder Eb, and a crankcase 10 extends rearward from a lower portion of the cylinder Eb. The electric motor M provided for driving the drive wheel and configured to generate drive power to be transmitted to the drive wheel is disposed rearward of the cylinder Eb of the engine E and above the crankcase 10. The electric motor M is supported by the main frame 4b via the crankcase 10. An inverter 12 is mounted integrally with the electric motor M. The inverter 12 may be disposed away from the electric motor M.

Inside the crankcase 10 is disposed a transmission 11 including an input shaft 11a and an output shaft 11b. The input shaft 11a receives power transmitted from a crankshaft Ea of the engine E through gears and a main clutch (not illustrated). The input shaft 11a of the transmission 11 receives power transmitted from the electric motor M through a non-illustrated power transmission mechanism. That is, both power of the engine E and power of the electric motor M are transmitted to the input shaft 11a. A swing arm 13 supporting the rear wheel 3 and extending in the forward/rearward direction is supported by the vehicle body frame 4, and the swing arm 13 is angularly movable. The rotational power of the output shaft 11b of the transmission 11 is transmitted to the rear wheel 3 through an output transmission member 14 (e.g., a chain or belt).

A battery pack 15 supported by the seat support frame 4c is disposed rearward of the electric motor M. In particular, the battery pack 15 is disposed under the seat 9. The fact that the battery pack 15 provided for the drive system and storing electric power to be supplied to the electric motor M is disposed under the seat 9 means that the battery pack 15 which is a heavy component is located in the vicinity of the center of gravity of the motorcycle 1. A DC-DC converter 16 supported by the seat support frame 4c is disposed rearward of the battery pack 15. The DC-DC converter 16 reduces the voltage of the electric power output from the battery pack 15.

An auxiliary battery 17 supported by the seat support frame 4c is disposed rearward of the DC-DC converter 16. The auxiliary battery 17 receives a supply of the electric power output from the battery pack 15 and subjected to voltage drop across the DC-DC converter 16. Thus, the battery pack 15 outputs high-voltage electric power for activation of the electric motor M serving as a drive power source, while the auxiliary battery 17 outputs low-voltage electric power to be supplied to electronic components (such as an ECU).

In side view, the electric motor M, the battery pack 15, the DC-DC converter 16, and the auxiliary battery 17 are arranged in the direction in which the seat support frame 4c extends. Thus, a wire harness (not illustrated) connecting the electric motor M, battery pack 15, DC-DC converter 16, and auxiliary battery 17 together can be laid approximately along a straight line in side view. This allows for increased efficiency in laying the wire harness.

The lower end of the battery pack 15 is located below and forward of the upper end of the rear wheel 3. A portion of the battery pack 15 is located below the seat support frame 4c. The battery pack 15, DC-DC converter 16, and auxiliary battery 17 are covered from below by a rear fender 18 facing the rear wheel 3. The rear fender 18 is supported by the seat support frame 4c. A front portion of the rear fender 18 covers the rear and bottom surfaces of the battery pack 15. Thus, the battery pack 15, despite being disposed forward of and above the rear wheel 3, is prevented from being splashed with mud water coming from the rear wheel 3.

The battery pack 15 is located inward of the seat support frame 4c and the auxiliary frame 4d in the vehicle width direction. The two side surfaces (left and right surfaces) of the battery pack 15, which are opposed in the vehicle width direction, are exposed outside the motorcycle 1. Thus, the two side surfaces of the battery pack 15 in the vehicle width direction are exposed in a side view of the motorcycle 1 and are subjected directly to air stream flowing around the motorcycle 1 during travel.

Figure 2:
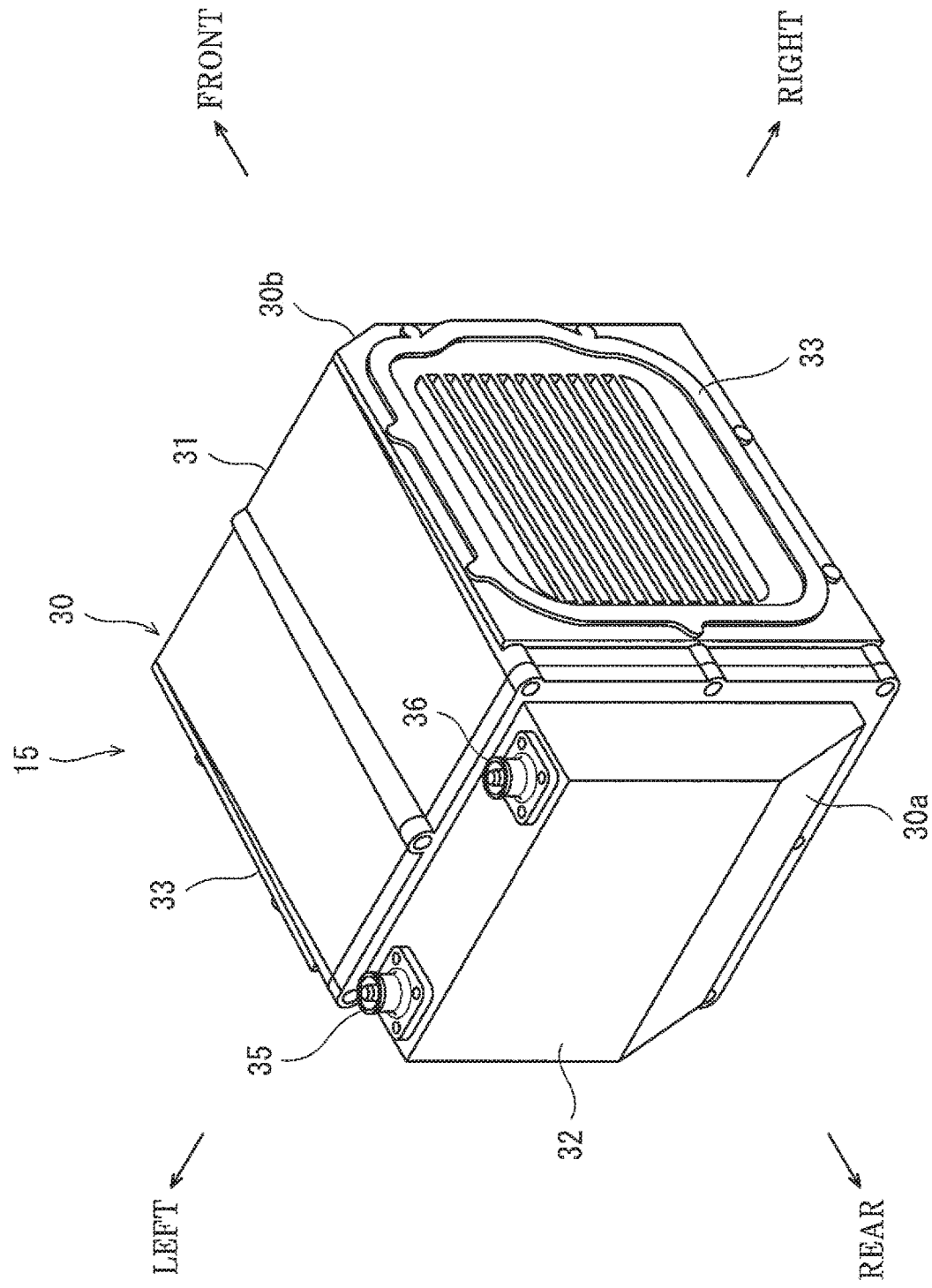
FIG. 2 is a perspective view of a battery pack adapted to be mounted on the motorcycle of FIG. 1.

FIG. 2 is a perspective view of the battery pack 15 adapted to be mounted on the motorcycle 1 of FIG. 1. As shown in FIG. 2, the battery pack 15 includes a casing 30 in the form of an approximately rectangular box. The casing 30 includes a casing body 31, a cover 32, and radiating fin members 33. The casing body 31 and the radiating fin members 33 define an electric power source accommodation space. That is, battery cells 34 described later (see FIG. 4) are disposed in the internal space defined by the casing body 31 and the radiating fin members 33. The cover 32 defines an electronic component accommodation space. The cover 32 has a recess defining an internal space, in which is disposed an electronic component assembly 60 described later (which includes, for example, a battery management system (BMS) 51, a relay 52, a fuse 53, and a current sensor 54).

The casing body 31 and cover 32 are made of resin, while the radiating fin members 33 are made of metal (e.g., aluminum alloy). The radiating fin members 33 form the two side walls of the casing 30, respectively. Since the radiating fin members 33 are disposed on the side surfaces of the casing 30, the radiating fin members 33 successfully exchange heat with rearward stream of air passing through the legs of the rider sitting on the seat 9 during travel, and thus the battery pack 15 is suitably cooled.

The cover 32 forms the rear wall of the casing 30. Alternatively, the cover 32 may form the front wall of the casing 30. The cover 32 is provided with connectors 35 and 36 electrically connected to the battery cells 34 and electronic component assembly 60 which are described later. In other words, the connectors 35 and 36 are mounted on a rear end portion of the casing 30. Since the connectors 35 and 36 are mounted on a rear end portion of the casing 30, electric wires can easily be laid to connect the battery pack 15 to electronic components (such as an ECU) mounted at different locations than the battery pack 15.

The rear lower edge of the battery pack 15 is chamfered. In other words, a chamfered portion 30a is provided at the rear lower end of the casing 30. Thus, the battery pack 15 can be located as close to the rear wheel 3 disposed rearward of and below the battery pack 15 as possible, and this allows for increased flexibility in mounting the relatively large battery pack 15. The front upper edge of the battery pack 15 is also chamfered. In other words, a chamfered portion 30b is provided at the front upper end of the casing 30. Thus, the battery pack 15 can be located as close to a component disposed forward of and above the battery pack 15 (an example of the component is the fuel tank 8), and this allows for increased flexibility in mounting the relatively large battery pack 15.

Figure 3A:
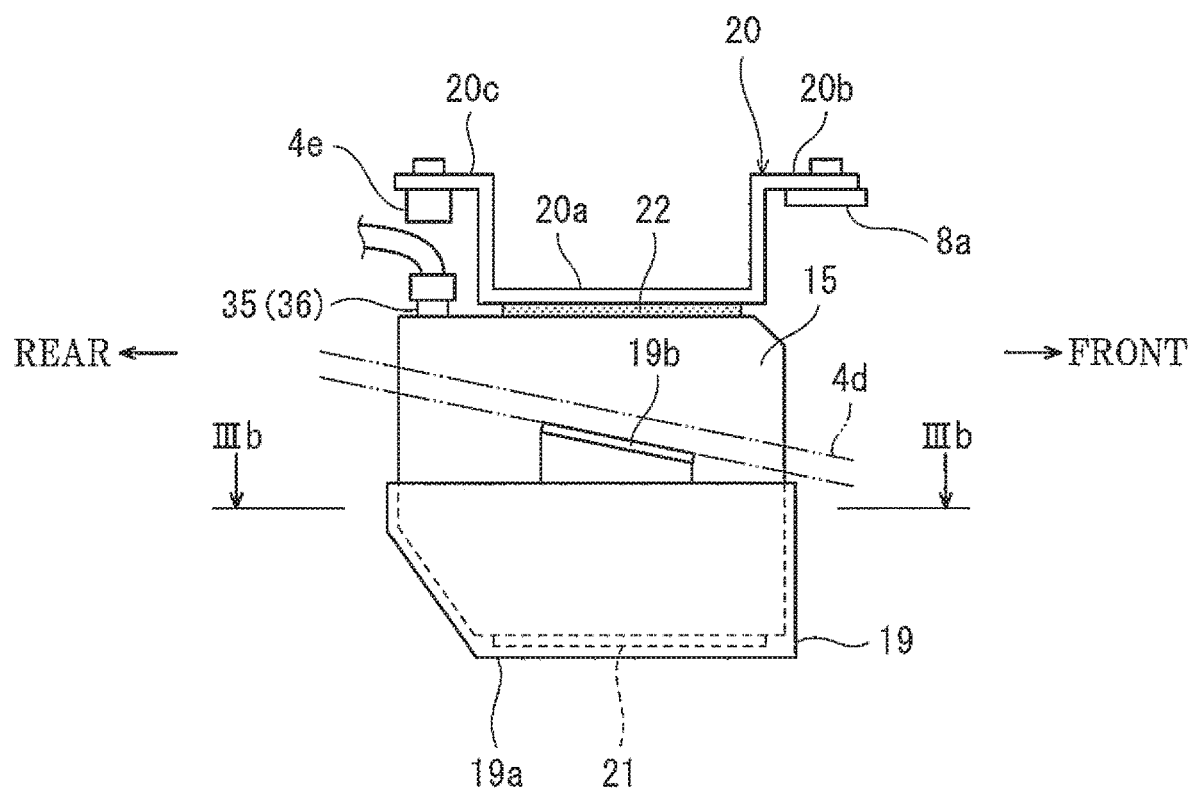
FIG. 3A is a side view of the battery pack of FIG. 2 mounted on the motorcycle.
Figure 3B:
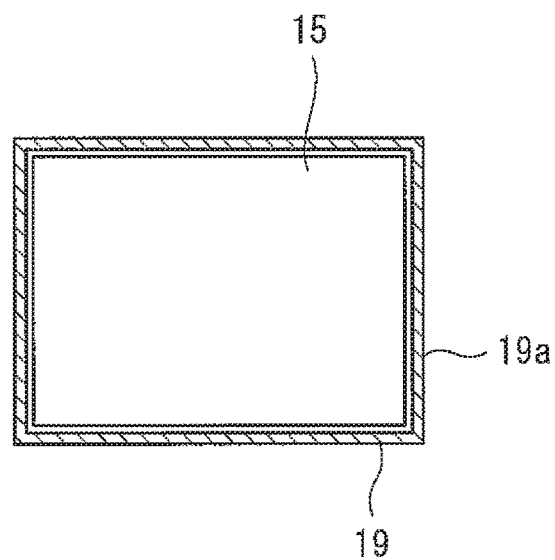
FIG. 3B is a cross-sectional view along the line of FIG. 3A.

FIG. 3A is a side view of the battery pack 15 of FIG. 2 mounted on the motorcycle 1. FIG. 3B is a cross-sectional view along the line IIIb-IIIb of FIG. 3A. As shown in FIGS. 3A and 3B, the vehicle body frame 4 includes a receiving base 19 supporting the battery pack 15. The receiving base 19 is made of metal. The receiving base 19 includes an accommodation portion 19a in the form of a recess having an upper opening and a mounting portion 19b projecting upward from the accommodation portion 19a. The mounting portion 19b is secured to the auxiliary frame 4d, and thus the receiving base 19 is supported by the vehicle body frame 4.

The battery pack 15 is placed into the accommodation portion 19a of the receiving base 19 from above. Between the battery pack 15 and the accommodation portion 19a is interposed an anti-vibration sheet 21 having elasticity. The accommodation portion 19a has a shape substantially conforming to the shape of that portion of the battery pack 15 which is placed inside the accommodation portion 19a. Specifically, the accommodation portion 19a has five surfaces which support the front, rear, left, right, and bottom surfaces of the battery pack 15, respectively. Thus, the battery pack 15 is held stably and integrally with the vehicle body frame 4 even during acceleration/deceleration and roll motion of the motorcycle 1. As such, the motorcycle 1 exhibits improved maneuverability despite the mounting of the relatively large battery pack 15 for the drive system.

The vehicle body frame 4 includes a presser member 20 that presses the top surface of the battery pack 15. The presser member 20 is made of metal. The presser member 20 includes a recessed portion 20a projecting downward, a mounting portion 20b projecting forward from the front upper edge of the recessed portion 20a, and a mounting portion 20c projecting rearward from the rear upper edge of the recessed portion 20a. The mounting portions 20b and 20c are secured to the vehicle body frame 4 or to another member secured to the vehicle body frame 4, and thus the presser member 20 is supported by the vehicle body frame 4.

For example, the mounting portion 20b is secured to a bracket 8a of the fuel tank 8, and the mounting portion 20c is secured to a cross member 4e of the seat support frame 4c. Thus, the battery pack 15 is held stably and integrally with the vehicle body frame 4 even during vertical vibration of the motorcycle 1. As such, the motorcycle 1 exhibits improved maneuverability despite the mounting of the relatively large battery pack 15 which stores electric power to be supplied to the electric motor M.

Figure 4:
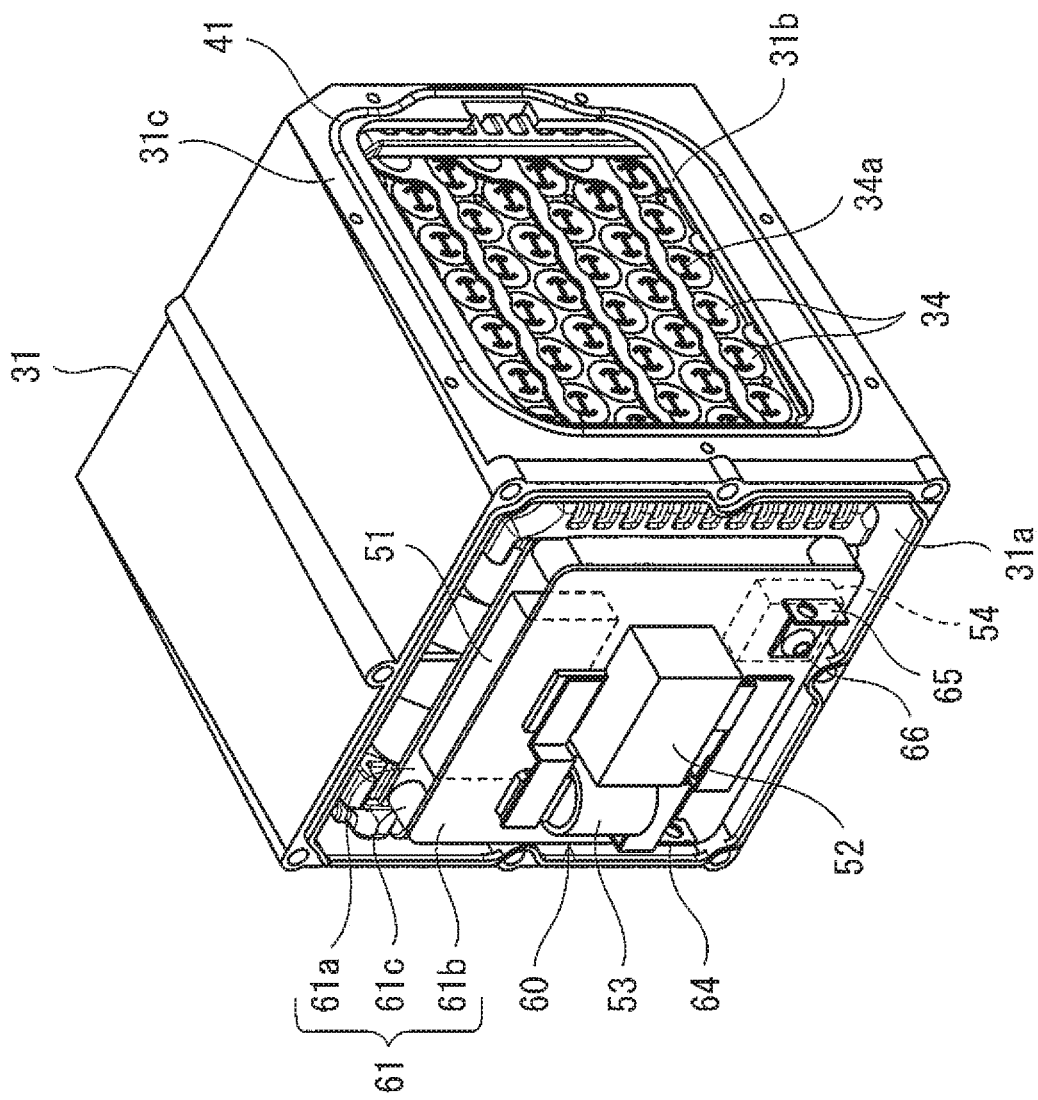
FIG. 4 is a perspective view of the battery pack of FIG. 2 with a cover and radiating fin members removed therefrom.
Figure 5:
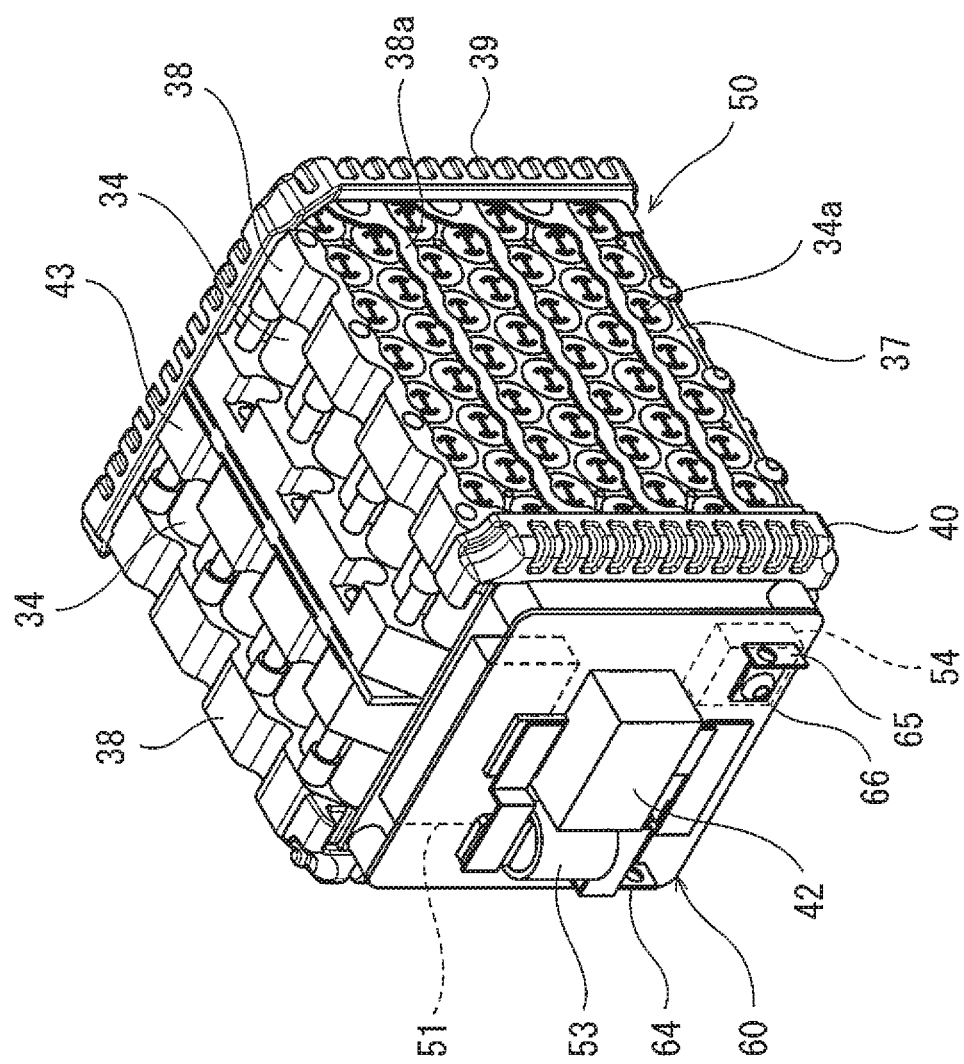
FIG. 5 is a perspective view of the battery pack of FIG. 4 with a casing removed therefrom.
Figure 6:
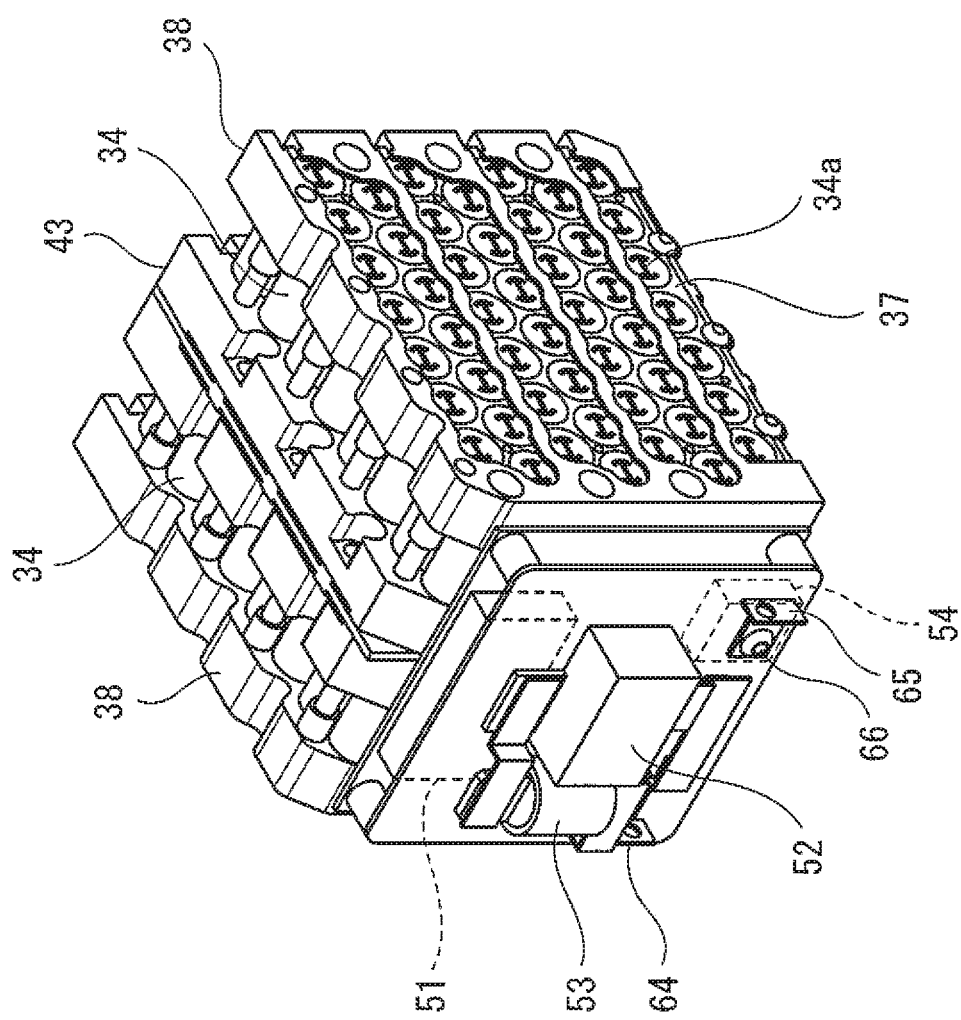
FIG. 6 is a perspective view of the battery pack of FIG. 5 with dampers removed therefrom.
Figure 7:
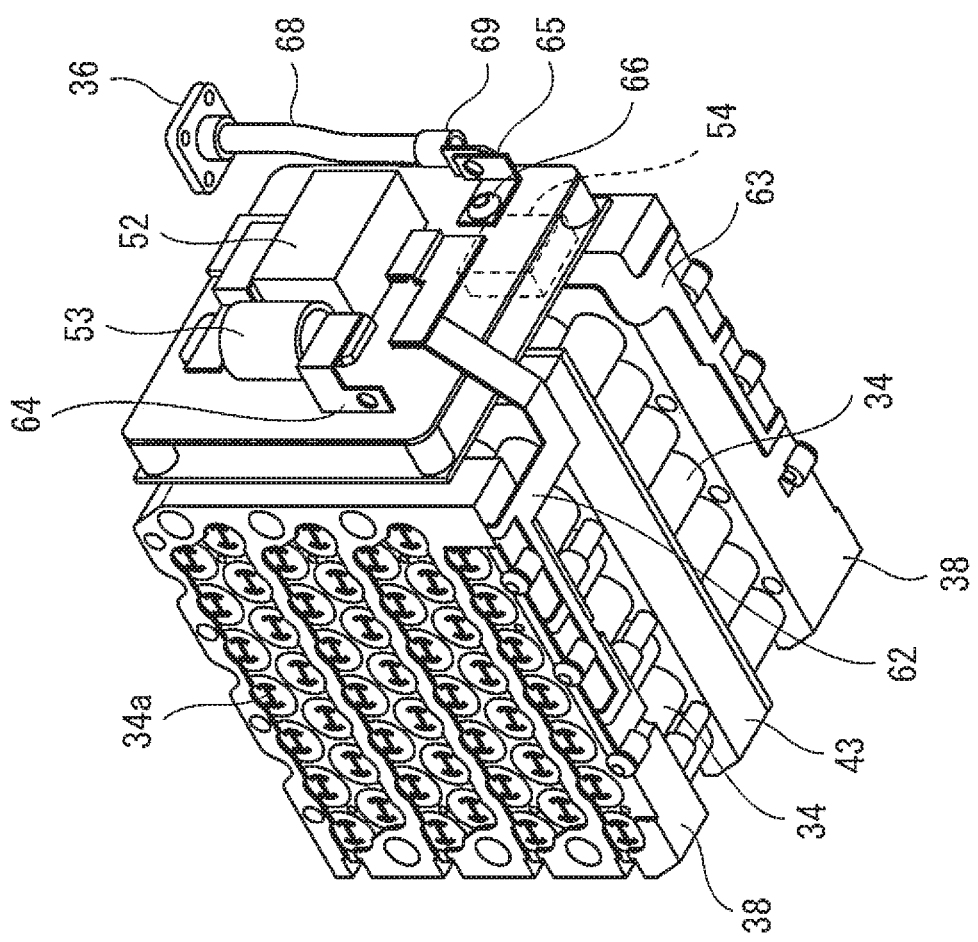
FIG. 7 is a bottom perspective view of the battery pack of FIG. 6.
Figure 8:
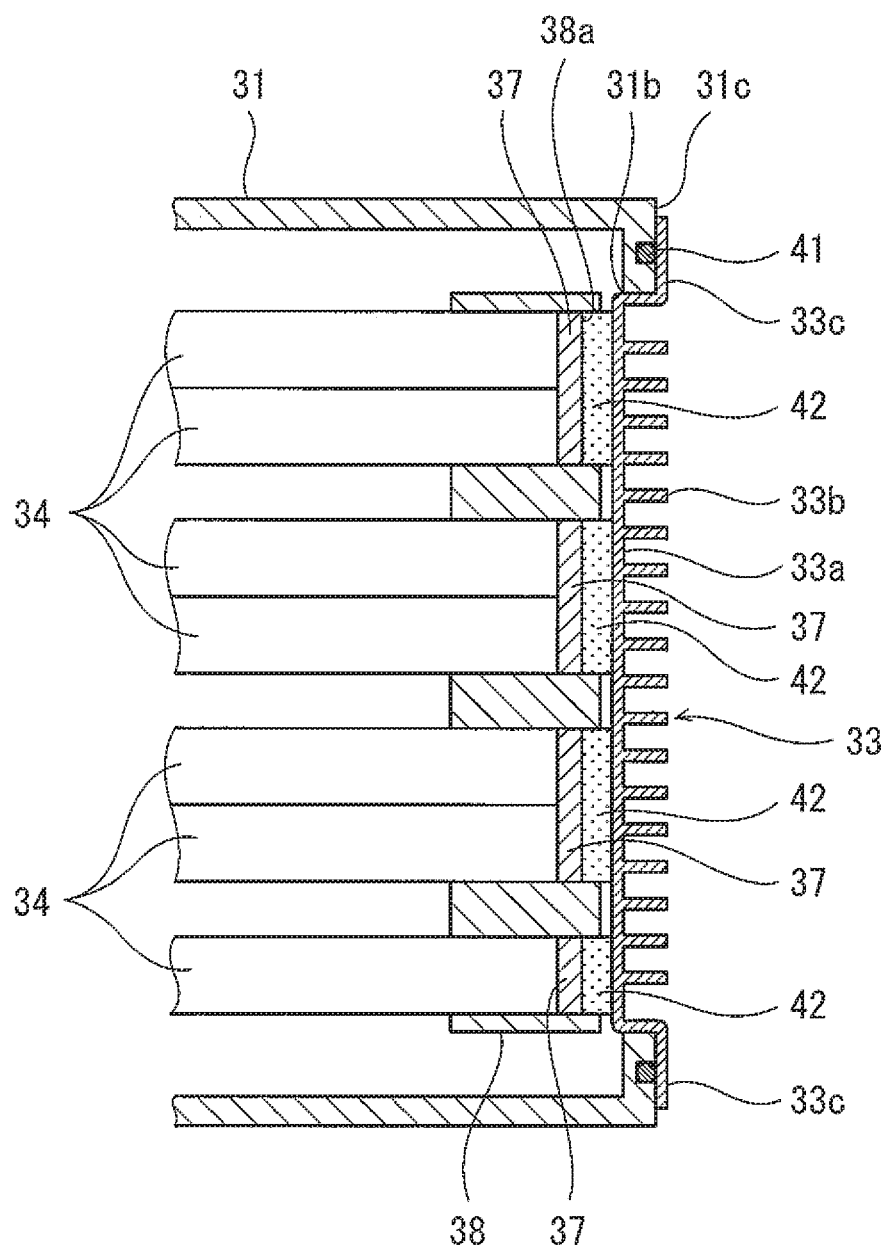
FIG. 8 is a longitudinal cross-sectional view of the radiating fin member and its neighboring components in the battery pack of FIG. 2.

FIG. 4 is a perspective view of the battery pack 15 of FIG. 2 with the cover 32 and radiating fin members 33 removed therefrom. FIG. 5 is a perspective view of the battery pack 15 of FIG. 4 with the casing 30 removed therefrom. FIG. 6 is a perspective view of the battery pack 15 of FIG. 5 with dampers 39 and 40 removed therefrom. FIG. 7 is a bottom perspective view of the battery pack 15 of FIG. 6. FIG. 8 is a longitudinal cross-sectional view of the radiating fin member 33 and its neighboring components in the battery pack 15 of FIG. 2. As shown in FIG. 2 and FIGS. 4 to 8, the casing body 31 of the battery pack 15 accommodates a plurality of battery cells 34. Each battery cell 34 is approximately cylindrical in shape, and the battery cells 34 are arranged to form a stack which is approximately in the shape of a rectangular parallelepiped. Terminals 34a of the battery cells 34 are directed outward in the leftward/rightward direction. The terminals 34a of the battery cells 34 arranged adjacent to one another are in electrical communication via a conductive plate 37. The normal to the conductive plate 37 is directed outward in the leftward/rightward direction.

The battery cells 34 are held by holders 38 and 43 made of resin. Specifically, the battery cells 34 are arranged in two rows in the leftward/rightward direction and held by a central holder 43 and a pair of end holders 38. The two rows of the battery cells 34 are divided by the central holder 43, and part of the battery cells 34 in one row and part of the battery cells 34 in the other row are in electrical communication via a line bypassing the central holder 43. In each of the two rows, the central holder 43-side ends of the battery cells 34 are held by the central holder 43, and the end holder 38-side ends of the battery cells 34 are held by the end holder 38.

Each end holder 38 has an opening 38a through which the conductive plate 37 and terminals 34a are exposed to the outside in the leftward/rightward direction. Dampers 39 and 40 made of an elastic material are fitted to the outer side of the holder 38. The dampers 39 and 40 are interposed between the casing 30 and the holders 38 and 43. Thus, when an external force acts on the battery pack 15, the dampers 39 and 40 reduce transmission of vibration or shock to the battery cells 34 held by the holders 38 and 43. The battery cells 34, the conductive plates 37, the holders 38 and 43, and the dampers 39 and 40 constitute an electric power source assembly 50 which is approximately in the shape of a rectangular parallelepiped.

The rear surface of the casing body 31 has an opening 31a through which the electric power source assembly 50 is inserted and removed. Each of the two side surfaces (left and right surfaces) of the casing body 31 has an exposure hole 31b through which the conductive plate 37 is exposed (and/or the terminals 34a are exposed). Through the exposure holes 31b, large portions of the side surfaces of the electric power source assembly 50 are exposed. Each of the two side walls of the casing body 31 includes a frame-shaped wall portion 31c formed around the exposure hole 31b. The opening 31a of the casing body 31 is closed by the cover 32.

The exposure holes 31b of the casing body 31 are closed by the radiating fin members 33 secured to the casing body 31. Each radiating fin member 33 faces the conductive plate 37 and the terminals 34a. Thus, the casing body 31, which is made of resin for the purpose of weight reduction, is reinforced by the radiating fin members 33 made of metal. As such, heat radiation from the battery cells 34, weight reduction of the casing 30, and sufficient strength of the casing 30 can be achieved at the same time.

The electronic component assembly 60 is disposed rearward of the electric power source assembly 50. The electronic component assembly 60 includes, for example, a BMS 51, a relay 52, a fuse 53, and a current sensor 54. An electronic component mounting base 61 is disposed on the rear surface of the electric power source assembly 50, and the electronic component mounting base 61 is secured to the holders 38 and 43. The electronic component mounting base 61 has a two-layer structure including a first substrate portion 61a, a second substrate portion 61b, and post portions 61c. The first substrate portion 61a and the second substrate portion 61b are parallel to the rear surface of the electric power source assembly 50. The first substrate portion 61a and second substrate portion 61b are spaced in the forward/rearward direction and are connected by the post portions 61c.

In the gap between the first substrate portion 61a and the second substrate portion 61b are disposed the BMS 51 and the current sensor 54, which are mounted on the first substrate portion 61a. The relay 52 and the fuse 53 are mounted on the rear surface of the second substrate portion 61b. A first bus bar 62 is disposed on the bottom surface of one of the end holders 38 and electrically connected to the conductive plate 37 disposed on one terminal side of the stack of the battery cells 34. A second bus bar 63 is disposed on the bottom surface of the other of the end holders 38 and electrically connected to the conductive plate 37 disposed on the other terminal side of the stack of the battery cells 34.

The first bus bar 62 is electrically connected to the relay 52, and the relay 52 is electrically connected to the fuse 53. The fuse 53 is electrically connected to a first conductive tab 64 projecting from the rear surface of the second substrate portion 61b. To the first conductive tab 64 is fastened a terminal (not illustrated) of an electric wire (not illustrated) connected to the connector 35. The second bus bar 63 is electrically connected to the current sensor 54, and the current sensor 54 is electrically connected, via a conductive bolt 66, to a second conductive tab 65 projecting from the rear surface of the second substrate portion 61b.

A terminal 69 (see FIG. 9) of an electric wire 68 connected to the connector 36 is fastened to the second conductive tab 65 by the conductive bolt 66. Thus, in the electric circuit formed between the connector 35 and connector 36, the first conductive tab 64, fuse 53, relay 52, first bus bar 62, battery cells 34, second bus bar 63, current sensor 54, conductive bolt 66, and second conductive tab 65 are arranged in series in this order.

When the electric power source assembly 50 is accommodated in the casing body 31, the electronic component assembly 60 is located outside the casing body 31. The cover 32 is attached to the casing body 31, so that the electronic component assembly 60 is accommodated in the cover 32. Since the electronic component assembly 60 is located outside the casing body 31, the electronic component assembly 60 can easily be accessed with the cover 32 removed from the casing body 31.

The connectors 35 and 36 are mounted on a rear end portion of the casing 30 (i.e., on the cover 32), and the electronic component assembly 60 is disposed rearwardly adjacent to the electric power source assembly 50. Thus, the height dimension of the battery pack 15 is smaller than when the electronic component assembly 60 is disposed adjacent to the electric power source assembly 50 in the upward/downward direction. As such, while the battery pack 15 is disposed under the seat 9, the size of the electric power source assembly 50 can be made as large as possible to achieve a high capacity of the battery pack 15. Additionally, the width dimension of the battery pack 15 is smaller than when the electronic component assembly 60 is disposed adjacent to the electric power source assembly 50 in the leftward/rightward direction. As such, it is not necessary that a portion of the vehicle body frame 4 that is lateral to the battery pack 15 be extended outward in the vehicle width direction. Consequently, an increase in the vehicle width can be avoided to prevent a decrease in the ease with which the rider places the feet on the ground.

As shown in FIG. 8, each radiating fin member 33 includes a fitting portion 33a fitted in the exposure hole 31b of the casing body 31 and a flange portion 33c projecting from the fitting portion 33a and extending along the outer surface of the frame-shaped wall portion 31c. The fitting portion 33a is provided with a plurality of fins 33b. The flange portion 33c is placed on and secured to the frame-shaped wall portion 31c, with a seal member 41 interposed between the flange portion 33c and the frame-shaped wall portion 31c. Since the fitting portion 33a of the radiating fin member 33 is fitted in the exposure hole 31b of the casing body 31 and the flange portion 33c of the radiating fin member 33 is placed on and secured to the frame-shaped wall portion 31c of the casing body 31, the casing body 31 made of resin is more suitably reinforced by the radiating fin member 33 made of metal.

The fitting portion 33a of the radiating fin member 33 is pressed toward the conductive plate 37 and/or the terminals 34a of the battery cells 34, and a heat transfer member 42 having electrical insulating properties and elasticity (the material of the heat transfer member is silicone, for example) is interposed between the fitting portion 33a and the conductive plate 37 and/or the terminals 34a. The conductive plate 37 and terminals 34a are located farther from the radiating fin member 33 than is the outer end surface of the end holder 38 in the vehicle width direction. Thus, the opening 38a of the end holder 38 and the outer end surface of the conductive plate 37 in the vehicle width direction define a recess, and the heat transfer member 42 is fitted in this recess. The heat transfer member 42 projects outward beyond the outer end surface of the end holder 38 in the vehicle width direction and is in close contact with the radiating fin member 33. This allows for increased efficiency of heat transfer from the terminals 34a of the battery cells 34 to the radiating fin member 33.

As shown in FIG. 2, the connectors 35 and 36 are mounted on the upper end portion (first end portion) of the cover 32. The cover 32 is provided with the chamfered portion 30a, and thus the thickness of the lower end portion (second end portion) of the cover 32 is smaller than the thickness of the upper end portion (first end portion) of the cover 32. Since the cover 32 does not accommodate the electric power source assembly 50 but the electronic component assembly 60, the thickness of the cover 32 can be partially reduced without having to reduce the size of the battery cells 34.

Figure 9:
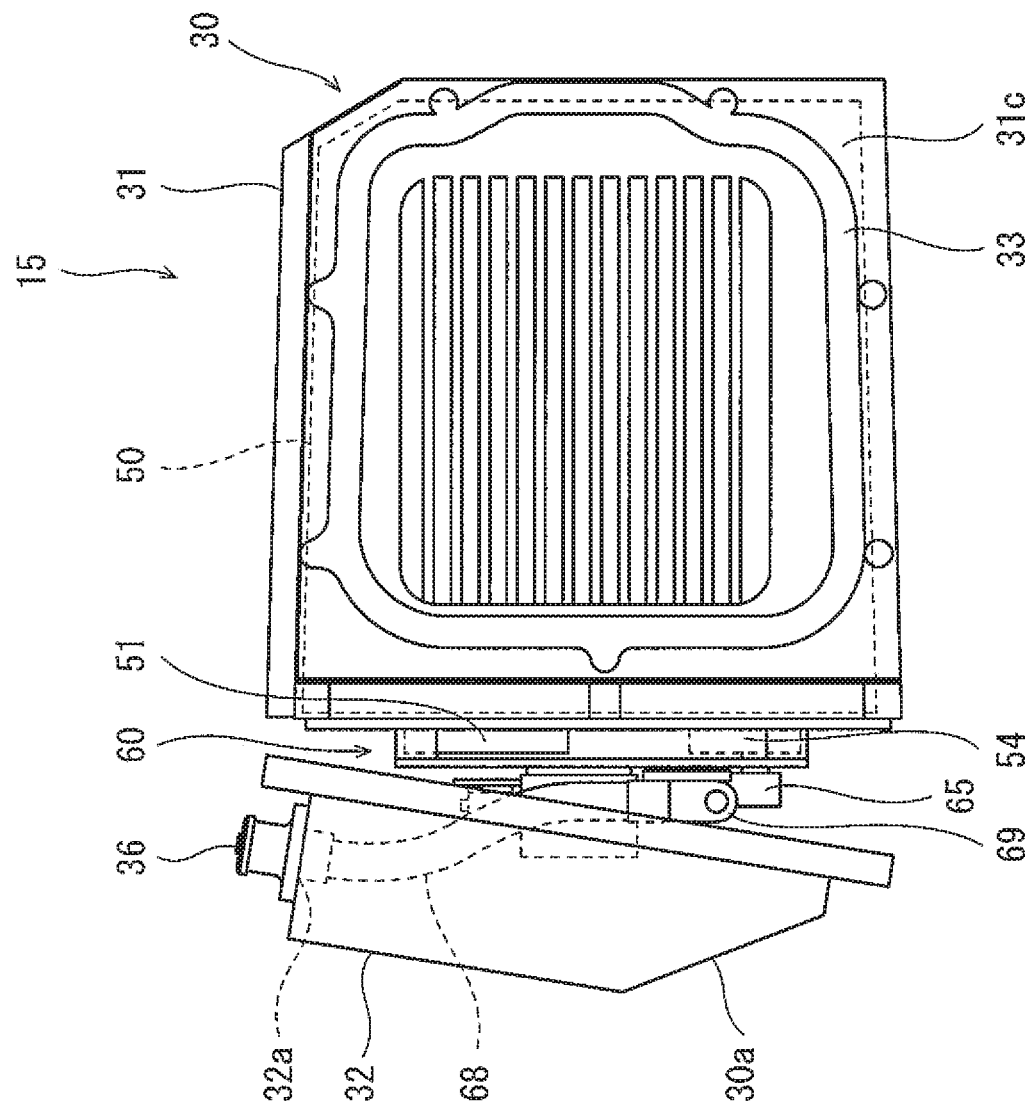
FIG. 9 is a side view illustrating how to attach the cover of the battery pack of FIG. 2.

FIG. 9 is a side view illustrating how to attach the cover 32 of the battery pack 15 of FIG. 2. As shown in FIG. 9, the upper wall portion of the cover 32 is provided with a pair of insertion holes 32a. The connectors 35 and 36 are attached to the cover 32 by being inserted in the insertion holes 32a. Thus, the assembling operation is easier than when the connectors 35 and 36 are attached to the casing body 31. Hereinafter, connection of the connector 36 to the electronic component assembly 60 will be described. The same discussion applies to the connector 35.

To the connector 36 is connected one end of the electric wire 68. To the other end of the electric wire 68 is connected the terminal 69. With the terminal 69 connected to the second conductive tab 65, the electric wire 68 is electrically connected to the battery cells 34. The terminal 69 is fastened to the second conductive tab 65 of the electronic component assembly 60 by a fastening member (not illustrated) in a lateral direction which is along the plane of contact between the casing body 31 and the cover 32. Thus, the work of fastening the terminal 69 to the second conductive tab 65 is performed in a state where the cover 32 has yet to be attached to the casing body 31 and where the terminal 69 lies outside the cover 32 in side view (where the terminal 69 is not hidden by the cover 32 in side view).

The second conductive tab 65 (first conductive tab 64) is located below the center of the electronic component assembly 60 in the upward/downward direction. In other words, the location of the second conductive tab 65 (first conductive tab 64) in the electronic component assembly 60 is distal from the connector 36 (connector 35). Thus, even when the extra length of the electric wire 68 is small, the work of fastening the terminal 69 to the second conductive tab 65 can be performed by tilting the cover 32 relative to the casing body 31.

The present invention is not limited to the embodiment described above, and modifications, additions, or omissions can be made to the configuration of the above embodiment. For example, while a motorcycle has been described as an exemplary straddle vehicle, the present invention is applicable to any other type of vehicle (such as a three-wheeled vehicle) on which the rider is seated in a straddling position. The electronic component assembly 60 may be disposed forward of the electric power source assembly 50 and, in this case, the cover 32 and the connectors 35 and 36 may be disposed forward of the casing body 31. The connectors 35 and 36 may be mounted on the lower side of the cover 32 rather than on the upper side of the cover 32.

Many modifications and other embodiments of the present invention will be apparent to those skilled in the art from the foregoing description. Accordingly, the foregoing description is to be construed as illustrative only, and is provided for the purpose of teaching those skilled in the art the best mode for carrying out the invention. The details of the structure and/or function may be varied substantially without departing from the scope of the invention.

What is claimed is:

1. A straddle vehicle comprising:
   a driving electric motor configured to generate drive power to be transmitted to a drive wheel;
   a seat on which a rider sits;
   a battery pack disposed under the seat and storing electric power to be supplied to the driving electric motor; and
   a vehicle body frame comprising a receiving base supporting the battery pack and a presser member pressing a top surface of the battery pack, wherein
   the receiving base includes five surfaces supporting front, rear, left, right, and bottom surfaces of the battery pack, respectively,
   the presser member includes a recessed portion projecting downward, a first mounting portion projecting forward from a front upper edge of the recessed portion, and a second mounting portion projecting rearward from a rear upper edge of the recessed portion, and
   the first and second mounting portions are secured to the vehicle body frame or to another member secured to the vehicle body frame.

2. The straddle vehicle according to claim 1, further comprising:
   an auxiliary battery having a lower voltage than the battery pack; and
   a DC-DC converter configured to reduce the voltage of electric power output from the battery pack and supply the resulting electric power to the auxiliary battery, wherein
   the vehicle body frame comprises a main frame supporting the driving electric motor and a seat support frame extending obliquely upward and rearward from the main frame and supporting the seat, and
   in side view, the driving electric motor, the battery pack, the DC-DC converter, and the auxiliary battery are arranged in a direction in which the seat support frame extends.

3. The straddle vehicle according to claim 1, wherein a lower end of the battery pack is located below and forward of an upper end of a rear wheel serving as the drive wheel.

4. The straddle vehicle according to claim 1, wherein the battery pack comprises a battery cell, an electronic component electrically connected to the battery cell, a casing accommodating the battery cell and the electronic component, and a connector electrically connected to the battery cell and the electronic component, the electronic component is disposed adjacent to the battery cell in a forward/rearward direction, and the connector is mounted on an end portion of the casing in the forward/rearward direction.

5. The straddle vehicle according to claim 1, wherein a rear lower edge of the battery pack is chamfered.

6. A straddle vehicle comprising:

a driving electric motor configured to generate drive power to be transmitted to a drive wheel;

a seat on which a rider sits;

a battery pack disposed under the seat and storing electric power to be supplied to the driving electric motor; and a vehicle body frame comprising a receiving base supporting the battery pack, wherein the receiving base includes five surfaces supporting front, rear, left, right, and bottom surfaces of the battery pack, respectively, a side surface of the battery pack in a leftward/rightward direction is exposed when viewed from a left or right side of the straddle vehicle, and the battery pack comprises a radiating fin member, and the side surface of the battery pack includes a surface of the radiating fin member.

7. A straddle vehicle comprising:

a driving electric motor configured to generate drive power to be transmitted to a drive wheel;

a seat on which a rider sits;

a battery pack disposed under the seat and storing electric power to be supplied to the driving electric motor;

a vehicle body frame comprising a receiving base supporting the battery pack; and a rear fender facing the drive wheel, wherein the receiving base includes five surfaces supporting front, rear, left, right, and bottom surfaces of the battery pack, respectively, and a front portion of the rear fender covers the rear and bottom surfaces of the battery pack.

* * * * *